US012012908B2

(12) United States Patent
Satomi et al.

(10) Patent No.: US 12,012,908 B2
(45) Date of Patent: Jun. 18, 2024

(54) HYBRID ELECTRIC VEHICLE

(71) Applicant: TOYOTA JIDOSHA KABUSHIKI KAISHA, Aichi-ken (JP)

(72) Inventors: Tomohiko Satomi, Aichi-ken (JP); Masanao Idogawa, Aichi-ken (JP); Koji Ichikawa, Aichi-ken (JP); Tatsuro Shimada, Aichi-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/459,363

(22) Filed: Aug. 31, 2023

(65) Prior Publication Data

US 2024/0110529 A1 Apr. 4, 2024

(30) Foreign Application Priority Data

Sep. 29, 2022 (JP) ................................ 2022-156678

(51) Int. Cl.

*F02D 41/04* (2006.01)
*F02D 41/08* (2006.01)
*F02D 41/30* (2006.01)
*F02D 41/22* (2006.01)

(52) U.S. Cl.

CPC ......... *F02D 41/047* (2013.01); *F02D 41/083* (2013.01); *F02D 41/30* (2013.01); *F02D 2041/224* (2013.01); *F02D 2200/0602* (2013.01)

(58) Field of Classification Search

CPC ...... F02D 41/047; F02D 41/083; F02D 41/30; F02D 2041/224; F02D 2200/0602

See application file for complete search history.

(56) References Cited

U.S. PATENT DOCUMENTS 9,556,817 B2 * 1/2017 Mashiki .............. F02D 41/3005
9,797,358 B2 * 10/2017 Li .......................... F02D 37/02
10,161,350 B2 * 12/2018 Kitazume ............. F02D 41/402
10,876,490 B2 * 12/2020 Takemoto ........... F02D 41/1475
11,802,531 B2 * 10/2023 Satomi ..................... B60K 6/24
2010/0070158 A1 * 3/2010 Futonagane ......... F02M 45/086
239/548

(Continued)

FOREIGN PATENT DOCUMENTS

JP 2009-002196 A 1/2009
JP 2018-080630 A 5/2018
JP 2021-014813 A 2/2021

*Primary Examiner* — Carl C Staubach
(74) *Attorney, Agent, or Firm* — HAUPTMAN HAM, LLP

(57) ABSTRACT

When the vehicle is stopped and removal of deposits is not required, and forced charging of a power storage device is not being performed, the controller controls the fuel supply device so that a supply fuel pressure is at the first fuel pressure. When the vehicle is stopped and the removal of deposits is required, and the forced charging of the power storage device is being performed, the controller controls the fuel supply device so that the supply fuel pressure is at a second fuel pressure higher than the first fuel pressure. When the vehicle is stopped and the removal of deposits is required, and the forced charging of the power storage device is not being performed, the controller controls the fuel supply device so that the supply fuel pressure is at a third fuel pressure higher than the first fuel pressure and lower than the second fuel pressure.

2 Claims, 3 Drawing Sheets

(56) References Cited

U.S. PATENT DOCUMENTS

| | | | | |
|---|---|---|---|---|
| 2013/0233275 | A1* | 9/2013 | Berkemeier | F02B 17/005 123/295 |
| 2014/0216414 | A1* | 8/2014 | Kawabe | F02D 41/30 123/478 |
| 2015/0204266 | A1* | 7/2015 | Mashiki | F02D 41/3005 701/103 |
| 2018/0135553 | A1* | 5/2018 | Kitazume | F02D 41/3094 |
| 2020/0240349 | A1* | 7/2020 | Ueno | F02D 41/401 |
| 2020/0408165 | A1* | 12/2020 | Yoshimura | F02P 5/045 |
| 2023/0250783 | A1* | 8/2023 | Satomi | B60W 10/08 |

* cited by examiner

HYBRID ELECTRIC VEHICLE

CROSS-REFERENCE TO RELATED APPLICATION

The present disclosure claims priority to Japanese Patent Application No. 2022-156678 filed on Sep. 29, 2022, which is incorporated herein by reference in its entirety including specification, drawings and claims.

TECHNICAL FIELD

This disclosure relates to hybrid electric vehicles.

BACKGROUND

Conventionally, a system has been proposed to perform the removal of deposits when the amount of deposits adhering to the vicinity of the in-cylinder injection valve jets of an engine exceeds the allowable amount (see, for example, Patent Document 1). The removal of deposits is a process to remove deposits from the vicinity of the jets by increasing the fuel injection pressure of the in-cylinder injection valve to a predetermined pressure.

CITATION LIST

Patent Literature

PTL 1: JP2009-002196

SUMMARY

When the fuel injection pressure of the in-cylinder injection valve increases to a predetermined pressure, such as during engine idle operation when the amount of deposits exceeds the allowable amount, minimum injection amount that can be injected from the in-cylinder injection valve may be greater than required injection amount from the in-cylinder injection valve. In this case, the in-cylinder injection valve injects the minimum amount of fuel, resulting in excessive fuel injection, which may cause emission deterioration or other inconveniences. Based on this, if the fuel injection pressure of the in-cylinder injection valve is sufficiently low, such as during engine idle operation when the deposit amount exceeds the allowable amount, the amount of deposits adhering to the in-cylinder injection valve may further increase.

A main object of the hybrid electric vehicle of the present disclosure is to take appropriate action when the vehicle is stopped and the removal of deposits adhering to the cylinder injection valve is required.

In order to achieve the above main object, the hybrid electric vehicle of the present disclosure employs the following configuration.

The hybrid electric vehicle includes an engine including an in-cylinder injection valve, a fuel supply device configured to supply fuel to the in-cylinder injection valve, a motor configured to generate power using power from the engine and output power for running, a power storage device configured to exchange power with the motor, and a controller programmed to control the engine, the fuel supply device, and the motor. When the vehicle is stopped and removal of deposits from the in-cylinder injection valve is not required, and forced charging of the power storage device with load operation of the engine is not being performed, the controller is programmed to control the fuel supply device so that a supply fuel pressure, which is the pressure of the fuel supplied to the in-cylinder injection valve, is at a first fuel pressure. When the vehicle is stopped and the removal of the deposits is required, and the forced charging of the power storage device is being performed, the controller is programmed to control the fuel supply device so that the supply fuel pressure is at a second fuel pressure higher than the first fuel pressure. When the vehicle is stopped and the removal of the deposits is required, and the forced charging of the power storage device is not being performed, the controller is programmed to control the fuel supply device so that the supply fuel pressure is at a third fuel pressure higher than the first fuel pressure and lower than the second fuel pressure.

When the vehicle is stopped and the removal of deposits from the in-cylinder injection valve is not required, and the forced charging of the power storage device with the load operation of the engine is not being performed, the controller is programmed to control the fuel supply device so that a supply fuel pressure, which is the pressure of the fuel supplied to the in-cylinder injection valve, is at a first fuel pressure. When the vehicle is stopped and the removal of deposits is required, and the forced charging of the power storage device is being performed, the controller is programmed to control the fuel supply device so that the supply fuel pressure is at a second fuel pressure higher than the first fuel pressure. “The forced charging of the power storage device” is performed when the engine is operated under load to output a certain amount of power, the power from the engine is used to generate power by the motor, and the power storage device is charged by the power generated by the motor. The second fuel pressure is set as a value within the range of fuel pressure at which removal of deposits is possible. Therefore, the hybrid electric vehicle enable to remove deposits. At this time, the engine is under load to output a certain amount of power. Thus, the hybrid electric vehicle prevents the minimum injection amount that can be injected from the in-cylinder injection valve from being higher than the required injection amount of the in-cylinder injection valve, resulting in an excessive fuel injection. Therefore, the hybrid electric vehicle suppresses the occurrence of inconveniences such as worsening emissions. When the vehicle is stopped and the removal of deposits is required, and the forced charging of the power storage device is not being performed, the controller is programmed to control the fuel supply device so that the supply fuel pressure is at a third fuel pressure higher than the first fuel pressure and lower than the second fuel pressure. The hybrid electric vehicle suppresses an increase in the amount of deposits compared to the case where the supply fuel pressure is at the first fuel pressure. In addition, the hybrid electric vehicle suppresses an excessive amount of fuel injection compared to the case where the supply fuel pressure is at the second fuel pressure.

DESCRIPTION OF EMBODIMENTS

Figure 1:
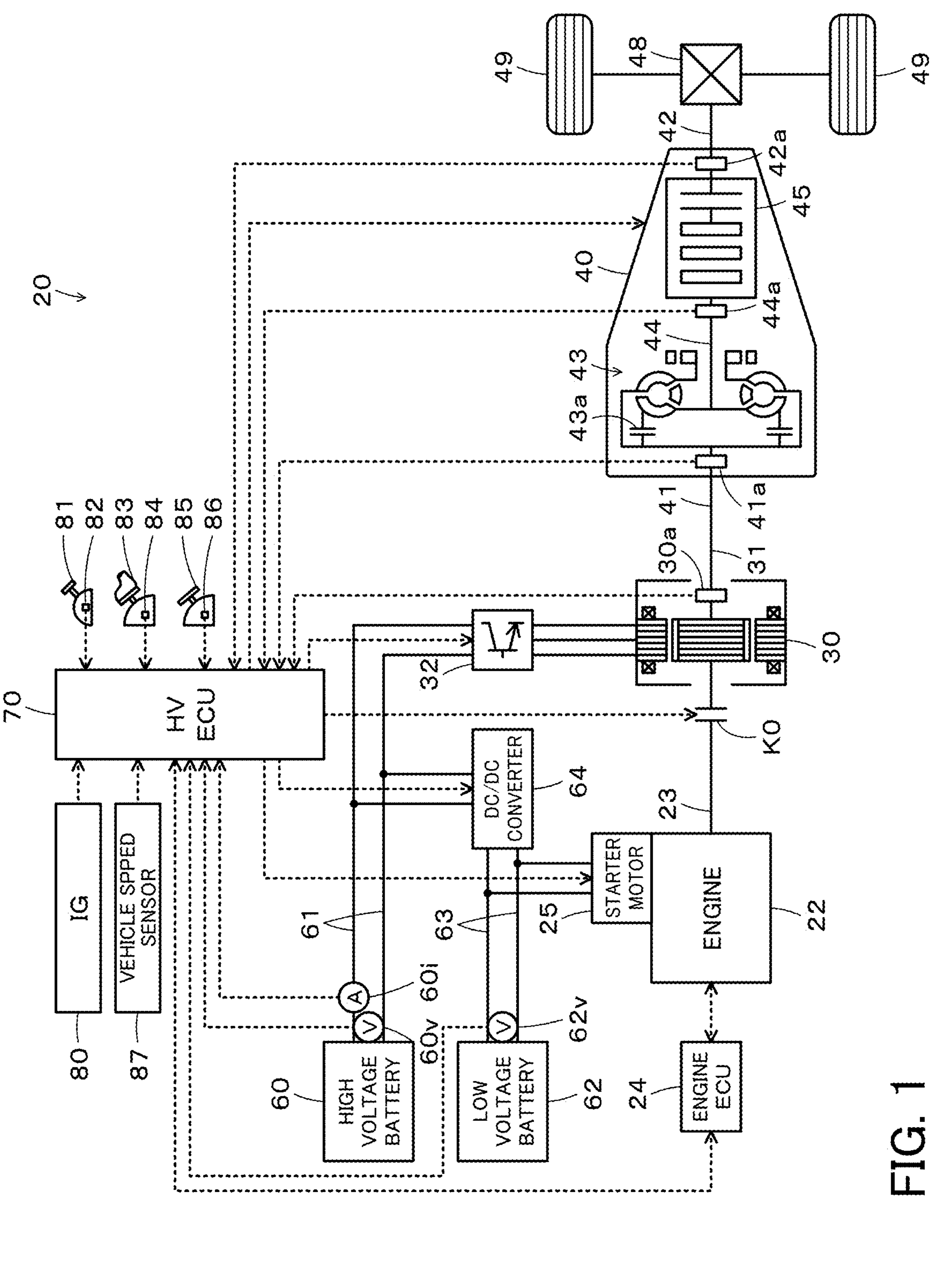
FIG. 1 is a schematic diagram of a hybrid electric vehicle.
Figure 2:
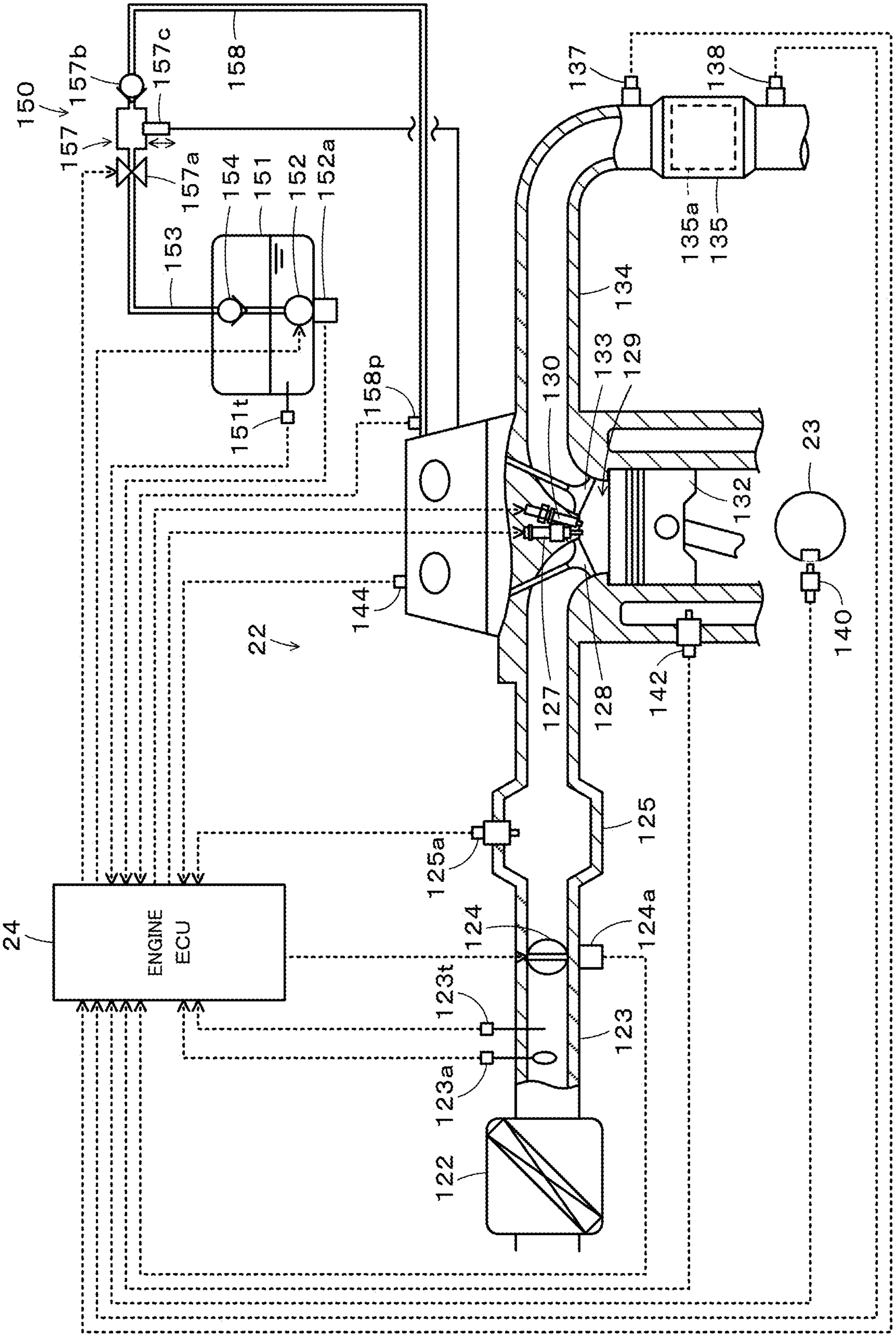
FIG. 2 is a schematic diagram of the engine installed in the hybrid electric vehicle.

Embodiments of the present disclosure will be described with reference to the drawings. FIG. 1 is a schematic diagram of a hybrid electric vehicle 20. FIG. 2 is a schematic diagram of an engine 22 installed in the hybrid electric vehicle 20. As shown in FIG. 1, the hybrid electric vehicle 20 includes an engine 22, a motor 30, an inverter 32, a clutch KO, an automatic transmission system 40, a high voltage battery 60, a low voltage battery 62, a DC/DC converter 64, and a hybrid electronic control unit (hereinafter referred to as the "HVECU") 70.

The engine 22 is configured as a multi-cylinder internal combustion engine that outputs power through four processes: intake, compression, expansion (explosive combustion), and exhaust, using fuel such as gasoline or light oil, for example. As shown in FIG. 2, engine 22 has a in-cylinder injection valve 127 and a spark plug 130. The in-cylinder injection valve 127 injects fuel supplied from the high pressure supply pipe 158 of the fuel supply device 150 into the combustion chamber 129. The in-cylinder injection valve 127 is located in the center of the top of the combustion chamber 129 and injects fuel in a spray form. The spark plug 130 is positioned near the in-cylinder injection valve 127 so that the fuel sprayed from the in-cylinder injection valve 127 can be ignited.

In the engine 22, air cleaned by the air cleaner 122 is admitted into the intake pipe 123, passes through the throttle valve 124 and the surge tank 125, and is further sucked into the combustion chamber 129 through the intake valve 128. Fuel is injected from the in-cylinder injection valve 127 during the intake and compression processes and ignited by the spark plug 130, resulting in explosive combustion of the mixture of air and fuel. The reciprocating motion of the piston 132, which is pushed down in the cylinder by the energy of explosive combustion, is converted into rotational motion of the crankshaft 23. The exhaust from the combustion chamber 129 through the exhaust valve 133 to the exhaust pipe 134, is discharged to the outside air through a purification device 135. The purification device 135 has a purification catalyst (three-way catalyst) 135*a*. The purifying catalyst 135*a* purifies harmful components in the exhaust such as carbon monoxide (CO), hydrocarbons (HC), and nitrogen oxides (NOx).

The fuel supply device 150 supplies fuel from the fuel tank 151 to the in-cylinder injection valve 127. The fuel supply device 150 includes a fuel tank 151, a feed pump 152, low pressure supply pipe 153, check valve 154, high pressure pump 157 and a high pressure supply pipe 158. The feed pump 152 is configured as an electric pump that operates on a supply of power from the low voltage battery 62 and is located in the fuel tank 151. The feed pump 152 supplies fuel from the fuel tank 151 to the low pressure supply pipe 153. The low pressure supply pipe 153 is connected to the high pressure pump 157. The check valve 154 is provided in the low pressure supply pipe 153. The check valve 154 allows fuel flow from the feed pump 152 side to the high pressure pump 157 side and regulates the flow of fuel in the reverse direction.

The high pressure pump 157 is driven by power from the engine 22 and pressurizes the fuel in the low pressure supply pipe 153 and supplies to the high pressure supply pipe 158. In this embodiment, the power from the engine 22 corresponds to the rotation of the intake camshaft that opens and closes the intake valve 128. The high pressure pump 157 has a solenoid valve 157*a*, a check valve 157*b*, and a plunger 157*c*. The solenoid valve 157*a* is connected to the inlet of the high pressure pump 157 and opens and closes when fuel is pressurized. The check valve 157*b* is connected to the discharge port of the high pressure pump 157 and regulates the backflow of fuel and maintains the fuel pressure in the high pressure supply pipe 158. The plunger 157*c* is actuated by the rotation of engine 22 (rotation of intake camshaft). The plunger 157*c* moves back and forth in the vertical direction in FIG. 2. When the engine 22 is running and the solenoid valve 157*a* is open, the high pressure pump 157 takes in fuel from the low pressure supply pipe 153. When the engine 22 is running and the solenoid valve 157*a* is closed, the high pressure pump 157 intermittently supplies fuel compressed by plunger 157*c* to the high pressure supply pipe 158 through the check valve 157*b*. The fuel supplied to the high pressure supply pipe 158 is therefore pressurized.

The engine 22 is operated and controlled by an electronic control unit for the engine (hereinafter referred to as the "engine ECU") 24. The engine ECU 24 includes a microcomputer having a CPU, ROM, RAM, flash memory, I/O ports, and communication ports. The engine ECU 24 inputs signals from various sensors via input ports. For example, the engine ECU 24 inputs a crank angle θ cr from a crank position sensor 140 that detects the rotational position of the crankshaft 23 of the engine 22, and a cooling water temperature Tw from a water temperature sensor 142 that detects the temperature of the cooling water of the engine 22. The engine ECU 24 also inputs a cam angles θ ci, θ co from the cam position sensor 144 that detects the rotational position of the intake camshaft that opens and closes the intake valve 128 and the rotational position of the exhaust camshaft that opens and closes the exhaust valve 133. The engine ECU 24 also inputs a throttle opening TH from a throttle position sensor 124*a* that detects the position of the throttle valve 124. The engine ECU 24 inputs an intake air volume Qa from an air flow meter 123*a* installed upstream of the throttle valve 124 in the intake pipe 123, an intake temperature Ta from a temperature sensor 123*t* installed upstream of the throttle valve 124 in the intake pipe 123, and a surge pressure Ps from a pressure sensor 125*a* attached to the surge tank 125. The engine ECU 24 also inputs a front air-fuel ratio AF1 from a front air-fuel ratio sensor 137 attached upstream of the purification device 135 in the exhaust pipe 134, and a rear air-fuel ratio AF2 from a rear air-fuel ratio sensor 138 attached downstream of the purification device 135 in the exhaust pipe 134. The engine ECU 24 inputs a fuel temperature Tftnk from a fuel temperature sensor 151*t* attached to the fuel tank 151, a rotation speed Np of the feed pump 152 from a rotation speed sensor 152*a* attached to the feed pump 152, high pressure fuel pressure PH, which is the pressure of fuel supplied to the in-cylinder injection valve 127, from a fuel pressure sensor 158*p* attached near the in-cylinder injection valve 127 (for example, a high pressure delivery pipe) in the high pressure supply pipe 158.

The engine ECU 24 outputs various control signals via output ports. For example, the engine ECU 24 outputs control signals to the throttle valve 124, the in-cylinder injection valve 127, spark plug 130, feed pump 152, and high pressure pump 157 (solenoid valve 157*a*). The engine ECU 24 is connected to the HVECU 70 via a communication port. The engine ECU 24 calculates a rotation speed Ne and a load factor KL. The rotation speed Ne is calculated based on the crank angle θ cr of the engine 22. The load factor KL is defined as the ratio of the volume of air actually inhaled in one cycle to the stroke volume per cycle of the engine 22. The load factor KL is calculated based on the intake air volume Qa and the rotation speed Ne.

As shown in FIG. 1, a starter motor 25 for cranking the engine 22 is connected to a crankshaft 23 of the engine 22. The starter motor 25 is connected to the low voltage side power line 63 together with the low voltage battery 62. The motor 30 is configured as a synchronous generator motor. A rotating shaft 31 to which the rotor of the motor 30 is fixed is connected to the crankshaft 23 of the engine 22 via the clutch KO and to the input shaft 41 of the automatic transmission system 40. The inverter 32 is used to drive the motor 30 and is connected to the high voltage side power line 61. The motor 30 is rotationally driven by controlling the switching of a plurality of switching elements of the inverter 32 by the HVECU 70.

The clutch KO is configured, for example, as a hydraulically driven friction clutch, and connects and disconnects the crankshaft 23 of the engine 22 and the rotating shaft 31 of the motor 30. The automatic transmission system 40 has a torque converter 43 and a six-speed automatic transmission 45, for example. The torque converter 43 is configured as a general fluid transmission device. The torque converter 43 transmits the power of the input shaft 41 connected to the rotary shaft 31 of the motor to the intermediate shaft 44, which is the input shaft of the automatic transmission 45, with or without amplifying the torque. The automatic transmission 45 has the intermediate shaft 44, an output shaft 42, a plurality of planetary gears, and a plurality of hydraulically driven frictional engagement elements (clutches and brakes). The output shaft 42 is connected to drive wheels 49 via a differential gear 48. The automatic transmission 45 forms 1st to 6th forward gears and reverse gears by engaging and disengaging a plurality of the friction engagement elements, and transmits power between the intermediate shaft 44 and the output shaft 42.

The high voltage battery 60 is configured as, for example, a lithium-ion secondary battery or a nickel-hydrogen secondary battery with a rated voltage of about several hundred volts, and is connected to the high voltage side power line 61 together with the inverter 32. The low voltage battery 62 is configured as, for example, a lead-acid battery with a rated voltage of about 12 V or 14 V, and is connected to the low voltage side power line 63 together with the starter motor 25. The DC/DC converter 64 is connected to the high voltage side power line 61 and the low voltage side power line 63, steps down the power of the high voltage side power line 61 and supplies the power to the low voltage side power line 63.

The HVECU 70 includes a microcomputer having a CPU, ROM, RAM, flash memory, input/output ports, and communication ports. The HVECU 70 inputs signals from various sensors. For example, the HVECU 70 inputs a rotational position θ m from a rotational position sensor **30*a* that detects the rotational position of the rotor (rotating shaft 31) of the motor 30, a rotation speed Nin from a rotation speed sensor 41*a* attached to the input shaft 41, a rotation speed Nmi from a rotation speed sensor 44*a* attached to the intermediate shaft 44, and a rotation speed Nout from a rotation speed sensor 42*a* attached to the output shaft 42. The HVECU 70 inputs a voltage Vbh from a voltage sensor 60*v* attached between terminals of the high voltage battery 60, a current Ibh from a current sensor 60*i* attached to the output terminal of the high voltage battery 60, and the voltage Vbl from the voltage sensor 62*v* attached between terminals of the low voltage battery 62. The HVECU 70 inputs an ignition signal from an ignition switch 80, a shift position SP from a shift position sensor 82 that detects the operating position of a shift lever 81, an accelerator opening Acc from an accelerator pedal sensor 84 that detects the amount of depression of an accelerator pedal 83, a brake position BP from a brake pedal sensor 86 that detects the amount of depression of a brake pedal 85, and a vehicle speed V from a vehicle speed sensor 87**.

The HVECU 70 outputs various control signals through an output port. For example, HVECU 70 outputs control signals to the starter motor 25, the inverter 32, the clutch KO, the automatic transmission system 40 and the DC/DC converter 64.

The HVECU 70 is connected to the engine ECU 24 via a communication port. The HVECU 70 calculates a rotation speed Nm of the motor 30 and a state of charge SOCh of the high voltage battery 60. The rotation speed Nm is calculated based on the rotational position θ m of the rotor (rotating shaft 31) of the motor 30. The state of charge SOCh is calculated based on the integrated value of the current Ibh of the high voltage battery 60.

In this embodiment, the HVECU 70 and the engine ECU 24 cooperatively control the engine 22, the clutch KO, the motor 30 and the automatic transmission system 40 so that the hybrid electric vehicle 20 runs in a hybrid running mode (HV running mode) or an electric running mode (EV running mode). The HV running mode is a mode in which the vehicle runs using the power of the engine 22 with the clutch KO engaged. The EV running mode is a mode in which the vehicle runs without using the power of the engine 22 with the clutch KO released.

During operation of engine 22, when tip temperature Ttp of the in-cylinder injection valve 127 is less than threshold value Ttpref (for example, about 150° C.), mainly thermoplastic deposits adhere and accumulate near the tip of the in-cylinder injection valve 127. During operation of engine 22, when the tip temperature Ttp is equal to or higher than the threshold value Ttpref, mainly thermosetting deposits adhere and accumulate near the tip of the in-cylinder injection valve 127. The tip temperature Ttp of the in-cylinder injection valve 127 is estimated, for example, by applying the intake air volume Qa and the cooling water temperature Tw to a tip temperature estimation map. The tip temperature estimation map is determined in advance by experiments, analyses, and machine learning as the relationship between the intake air volume Qa, the cooling water temperature Tw, and the tip temperature Ttp. The tip temperature Ttp of the in-cylinder injection valve 127 is estimated to increase as the intake air volume Qa increases and as the cooling water temperature Tw increases.

The thermoplastic deposits are removed by fuel injection from the in-cylinder injection valve 127 when the high pressure fuel pressure PH is equal to or higher than the fuel pressure PHhi1. That is, the fuel pressure PHhi1 is set within a range equal to or higher than a lower limit fuel pressure at which the thermoplastic deposits adhering near the tip of the in-cylinder injection valve 127 can be removed by fuel injection from the in-cylinder injection valve 127. For example, the fuel pressure PHhi1 is about 10 MPa to 14 MPa. A request to remove the thermoplastic deposit is made from the time the counter C1 reaches or exceeds threshold value Cref11 until the counter C1 falls below threshold value Cref12 (eg, the value 0). The counter C1 is a counter that reflects the amount of thermoplastic deposits adhering near the tip of the in-cylinder injection valve 127. For example, when the cooling water temperature Tw of the engine 22 is equal to or higher than the threshold value Twref (for example, approximately 60° C. to 80° C.), the high pressure fuel pressure PH is less than the fuel pressure PHhi1, and the tip temperature Ttp of the in-cylinder injection valve 127 is less than the threshold value Ttpref, the counter C1 is counted up for each fuel injection. When the high pressure fuel pressure PH is equal to or higher than the fuel pressure PHhi1, the counter C1 is counted down for each fuel injection. The count-up amount of the counter C1 is set so as to increase as the high pressure fuel pressure PH decreases. This is because deposits tend to adhere and accumulate on the in-cylinder injection valve 127 as the high pressure fuel pressure PH decreases.

The thermosetting deposits are removed by fuel injection from the in-cylinder injection valve 127 when the high pressure fuel pressure PH is equal to or higher than the fuel pressure PHhi2, which is somewhat higher than the fuel pressure PHhi1. That is, the fuel pressure PHhi2 is set within a range equal to or higher than the lower limit fuel pressure at which the thermosetting deposits adhering near the tip of the in-cylinder injection valve 127 can be removed by fuel injection from the in-cylinder injection valve 127. For example, the fuel pressure PHhi2 is about 18 MPa to 22 MPa. A request to remove the thermosetting deposit is made from the time the counter C2 reaches or exceeds threshold value Cref21 until the counter C2 falls below threshold value Cref22 (eg, the value 0). The counter C2 is a counter that reflects the amount of thermosetting deposits adhering near the tip of the in-cylinder injection valve 127. For example, when the cooling water temperature Tw of the engine 22 is equal to or higher than the threshold value Twref, the high pressure fuel pressure PH is less than the fuel pressure PHhi2, and the tip temperature Ttp of the in-cylinder injection valve 127 is equal to or higher than the threshold value Ttpref, the counter C2 is counted up for each fuel injection. When the high pressure fuel pressure PH is equal to or higher than the fuel pressure PHhi2, the counter C2 is counted down with each fuel injection. The count-up amount of the counter C2 is set so as to increase as the high pressure fuel pressure PH decreases, similarly to the count-up amount of the counter C1.

Figure 3:
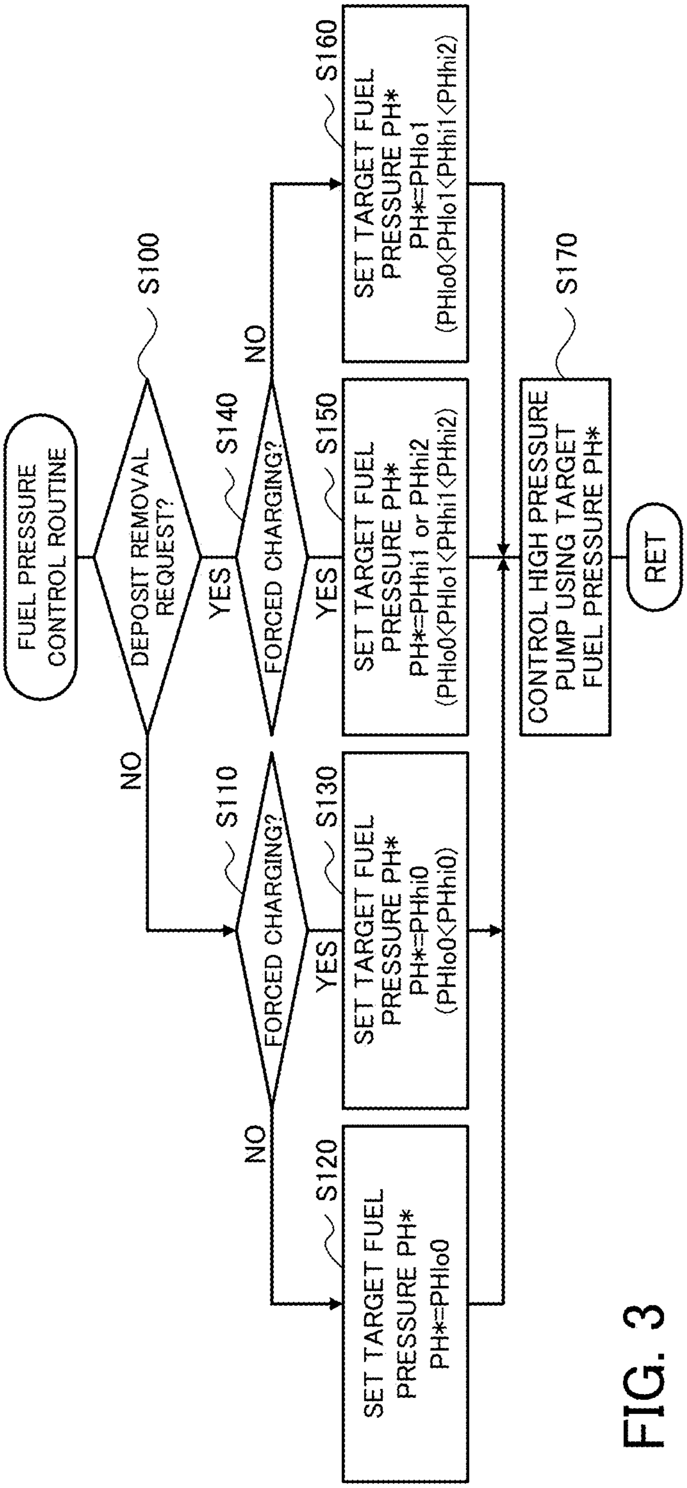
FIG. 3 is a flowchart showing an example of a fuel pressure control routine.

The following section describes the adjustment of the high pressure fuel pressure PH when the vehicle is stopped, the engine 22 is running, and removal of thermoplastic and/or thermosetting deposits are required. FIG. 3 is a flowchart showing an example of a fuel pressure control routine executed by the engine ECU 24. This routine is repeated when the vehicle is stopped and the engine 22 is running. When the vehicle is stopped and a forced charging of the high voltage battery 60 is required, the engine 22 is operated under load to output a certain amount of power, and the power from the engine 22 is used to generate power by the motor 30, and the high voltage battery 60 is charged with the generated power. A request for forced charging of the high voltage battery 60 is made when the state of charge SOCh of the high voltage battery 60 is less than threshold value Sref. When the vehicle is stopped, no forced charging of the high voltage battery 60 is requested, and when warming up of the engine 22 or heating of the cabin is requested, the engine 22 is operated at idle.

When the routine in FIG. 3 is executed, the engine ECU 24 determines whether the removal of the thermoplastic and/or thermosetting deposits is required (step S100). The engine ECU 24 also determines whether the forced charging of the high voltage battery 60 is being performed (steps S110, S140). The process of step S100 is performed using the counters C1 and C2 described above. The process of steps S110 and S140 is to determine whether the engine 22 is being operated under load to output a certain amount of power or operated at idle.

When the engine ECU 24 determines in step S100 that neither the thermoplastic nor the thermosetting deposits are required to be removed, and determines in step S110 that the forced charging of the high voltage battery 60 is not being performed, the engine ECU 24 executes the processes of steps S120 and S170. Specifically, the engine ECU 24 sets the target fuel pressure PH* to a relatively low fuel pressure PHlo0 (step S120). The engine ECU 24 controls the high pressure pump 157 (electromagnetic valve 157*a*) so that the high pressure fuel pressure PH becomes the target fuel pressure PH* (step S170). This routine is terminated. When the forced charging of the high voltage battery 60 is not being performed, the engine 22 is running at idle. Therefore, the high pressure fuel pressure PH is set relatively low.

When the engine ECU 24 determines in step S100 that neither the thermoplastic nor the thermosetting deposits are required to be removed, and determines in step S110 that the forced charging of the high voltage battery 60 is being performed, the engine ECU 24 executes the processes of steps S130 and S170. Specifically, the engine ECU 24 sets the target fuel pressure PH* to a fuel pressure PHhi0 sufficiently higher than the fuel pressure PHlo0 (step S130). The engine ECU 24 controls the high pressure pump 157 (electromagnetic valve 157*a*) so that the high pressure fuel pressure PH becomes the target fuel pressure PH* (step S170). This routine is terminated. When the forced charging of the high voltage battery 60 is being performed, the engine 22 is being operated under load to output a certain amount of power. Therefore, the high pressure fuel pressure PH is set relatively high.

When the engine ECU 24 determines in step S100 that the removal of the thermoplastic and/or thermosetting deposits is required, and determines in step S140 that the forced charging of the high voltage battery 60 is being performed, the engine ECU 24 executes the processes of steps S150 and S170. Specifically, the engine ECU 24 sets the target fuel pressure PH* to either the fuel pressure PHhi1 or PHhi2 sufficiently higher than the fuel pressure PHlo0 (step S150). The engine ECU 24 controls the high pressure pump 157 (electromagnetic valve 157*a*) so that the high pressure fuel pressure PH becomes the target fuel pressure PH* (step S170). This routine is terminated. In this embodiment, when only the removal of the thermoplastic deposits is required, the target fuel pressure PH* is set to the fuel pressure PH1*. When only the removal of the thermosetting deposits or both the thermoplastic and thermosetting deposits is required, the target fuel pressure PH* is set to the fuel pressure PH2*. The high pressure fuel pressure PH becomes either the fuel pressure PHhi1 or PHhi2. Therefore, fuel injection from the in-cylinder injection valve 127 removes the thermoplastic and/or thermosetting deposits.

When the engine ECU 24 determines in step S100 that the removal of the thermoplastic and/or thermosetting deposits is required, and determines in step S140 that the forced charging of the high voltage battery 60 is not being performed, the engine ECU 24 executes the processes of steps S160 and S170. Specifically, the engine ECU 24 sets the target fuel pressure PH* to the fuel pressure PHlo1 higher than the fuel pressure PHlo0 and lower than both the fuel pressure PHhi1 and PHhi2 (step S160). The engine ECU 24 controls the high pressure pump 157 (electromagnetic valve 157*a*) so that the high pressure fuel pressure PH becomes the target fuel pressure PH* (step S170). This routine is terminated. When the engine 22 is running at idle, the high pressure fuel pressure PH becomes the fuel pressure PHlo1. Compared to the case where the high pressure fuel pressure PH becomes the fuel pressure PHlo0, an increase in the amount of the thermoplastic and thermosetting deposits that adhere near the tip of the in-cylinder injection valve 127 is suppressed. This is based on the fact that the lower the high pressure fuel pressure PH, the more likely the thermoplastic and thermosetting deposits tend to adhere to and accumulate on the in-cylinder injection valve 127. The fuel pressure PHlo1 is set within a range that is equal to or higher than a lower fuel pressure limit that suppresses the increase in the amount of the thermoplastic and thermosetting deposits to some extent, and that is equal to or lower than a higher fuel pressure limit where the minimum injection amount Qmin that can be injected from the in-cylinder injection valve 127 is equal to or less than the idle injection amount Qid required for idle operation of the engine 22. For example, a fuel pressure PHlo1 is about 3.5 MPa to 4.5 MPa. The minimum injection volume Qmin is greater at higher the high pressure fuel pressure PH.

As mentioned above, the thermoplastic deposits are removed by fuel injection from the in-cylinder injection valve 127 when the high pressure fuel pressure PH is equal to or higher than the fuel pressure PHhi1. The thermosetting deposits are removed by fuel injection from the in-cylinder injection valve 127 when the high pressure fuel pressure PH is equal to or higher than the fuel pressure PHhi2. This section describes a case where the thermoplastic and/or thermosetting deposits are removed when the forced charging of the high voltage battery 60 is not being performed (when the engine 22 is running at idle) while the vehicle is stopped. In the case where fuel injection is performed from the in-cylinder injection valve 127 when high pressure fuel pressure PH is equal to or higher than either the fuel pressure PHhi1 or PHhi2, the minimum injection amount Qmin that can be injected from the in-cylinder injection valve 127 may be more than the idle injection amount Qid required for engine 22 to idle. In this case, the in-cylinder injection valve 127 injects fuel at the minimum injection amount Qmin, which is excessive compared to the idle injection amount Qid. Therefore, when the intake air amount Qa is not adjusted, the air-fuel ratio may become rich and the emissions may deteriorate. Further, when the intake air amount Qa is adjusted, there is a possibility that unexpected torque output or racing of the engine 22 will occur. Thus, in this embodiment, when the vehicle is stopped and the removal of thermoplastic and/or thermosetting deposits is required and the forced charging of the high voltage battery 60 is being performed (when the engine 22 is being operated under load to output a certain amount of power), the hybrid electric vehicle 20 sets the high pressure fuel pressure PH to either the fuel pressure PHhi1 or PHhi2. Therefore, the hybrid electric vehicle 20 prevents the minimum injection amount Qmin from being larger than the required injection amount Qf* required for the in-cylinder injection valve 127, thereby preventing inconveniences such as worsening emissions. In other words, when the high pressure fuel pressure PH is PHhi1 or PHhi2, respectively, required output of engine 22 (required charge power Pch* of high voltage battery 60) is set so that the minimum injection quantity Qmin is less than or equal to the required injection quantity Qf* of the in-cylinder injection valve 127 based on the required output of engine 22. The required charge power Pch* may be the same or different depending on whether the high pressure fuel pressure PH is the fuel pressure PHhi1 or the fuel pressure PHhi2. When the vehicle is stopped and the removal of the thermoplastic and/or thermosetting deposits is required and the forced charging of the high voltage battery 60 is not being performed (when the engine 22 is running at idle), the hybrid electric vehicle 20 sets the high pressure fuel pressure PH to the fuel pressure PHlo1. Therefore, the hybrid electric vehicle 20 prevents the minimum injection amount Qmin from being more than the idle injection amount Qid, thereby preventing inconveniences such as the worsening emissions.

In this embodiment described above, when the vehicle is stopped and the removal of the thermoplastic and thermosetting deposits is not required and the forced charging of the high voltage battery 60 is not being performed (the engine 22 is running at idle), the hybrid electric vehicle 20 sets the high pressure fuel pressure PH to the fuel pressure PHlo0 (first fuel pressure). Also, when the vehicle is stopped and the removal of thermoplastic and/or thermosetting deposits is required and the forced charging of the high voltage battery 60 is being performed (the engine 22 is being operated under load to output a certain amount of power), the hybrid electric vehicle 20 sets the high pressure fuel pressure PH to either the fuel pressure PHhi1 or PHhi2 (second fuel pressure). Therefore, the hybrid electric vehicle 20 removes the thermoplastic and/or thermosetting deposits. Furthermore, when the vehicle is stopped and the removal of thermoplastic and/or thermosetting deposits is required and the forced charging of the high voltage battery 60 is not being performed (the engine 22 is running at idle), the hybrid electric vehicle sets the high pressure fuel pressure PH to the fuel pressure PHlo1 (third fuel pressure). Therefore, compared to the case where the high pressure fuel pressure PH is the fuel pressure PHlo0, the hybrid electric vehicle 20 suppresses the increase in the amount of thermoplastic and thermosetting deposits that adhere near the tip of the in-cylinder injection valve 127. In addition, compared to the case where the high pressure fuel pressure PH is either the fuel pressure PHhi1 or PHhi2, the hybrid electric vehicle 20 suppresses the occurrence of inconveniences such as worsening emissions.

In the embodiment described above, when the vehicle is stopped and the removal of thermoplastic and/or thermosetting deposits is required and the forced charging of the high voltage battery 60 is being performed (the engine 22 is being operated under load to output a certain amount of power), the hybrid electric vehicle 20 sets the high pressure fuel pressure PH to either the fuel pressure PHhi1 or PHhi2. Therefore, the hybrid electric vehicle 20 removes the thermoplastic and/or thermosetting deposits. Similarly, when the vehicle is running and the removal of thermoplastic and/or thermosetting deposits is required and the forced charging of the high voltage battery 60 is being performed, the hybrid electric vehicle 20 may set the high pressure fuel pressure PH to either the fuel pressure PHhi1 or PHhi2.

In the embodiment described above, when the vehicle is stopped and the removal of thermoplastic and/or thermosetting deposits is required and the forced charging of the high voltage battery 60 is not being performed (the engine 22 is running at idle), the hybrid electric vehicle sets the high pressure fuel pressure PH to the fuel pressure PHlo1. Therefore, compared to the case where the high pressure fuel pressure PH is the fuel pressure PHlo0, the hybrid electric vehicle 20 suppresses the increase in the amount of thermoplastic and thermosetting deposits that adhere near the tip of the in-cylinder injection valve 127. When the vehicle is running and the removal of thermoplastic and/or thermosetting deposits is required and the forced charging of the high voltage battery 60 is not being performed, the hybrid electric vehicle 20 may set the high pressure fuel pressure PH to a fuel pressure within a range equal to or higher than the fuel pressure PHlo1 based on the required injection amount Qf* of the in-cylinder injection valve 127 based on the required output of the engine 22 based on the required output for running.

In the above-described embodiment, in the engine 22, the in-cylinder injection valve 127 is located substantially in the center of the top of the combustion chamber 129, and the spark plug 130 is positioned near the in-cylinder injection valve 127. However, the in-cylinder injection valve 127 may be located on the side of the combustion chamber 129 and the spark plug 130 may be positioned substantially in the center of the top of combustion chamber 129.

In the embodiment described above, the engine 22 has the in-cylinder injection valve 127. However, in addition to the in-cylinder injection valve 127, the engine 22 may further include an intake injection valve that injects fuel supplied from low pressure supply pipe 153 of fuel supply device 150 into an intake port.

In the above-described embodiment, the hybrid electric vehicle 20 includes the engine ECU 24 and the HVECU 70. However, the engine ECU 24 and the HVECU 70 may be configured integrally.

In the above embodiment, the hybrid electric vehicle includes the engine 22, the motor 30 connected to the engine 22 via the clutch KO, and the automatic transmission system 40 connected to motor 30 and drive wheels 49. However, the hybrid electric vehicle is not limited to this, and may include an engine, a motor capable of generating power using the power from the engine and outputting power for running, and a power storage device for exchanging power with the motor.

In the hybrid electric vehicle of the present disclosure, the controller may be programmed to operate the engine at idle when the engine is running and the forced charging of the power storage device is not being performed, and the second fuel pressure may be set within a range where a minimum injection amount that is allowed to be injected from the in-cylinder injection valve is equal to or less than an idle injection amount required for idle operation of the engine.

The following describes the correspondence relationship between the primary elements of the above embodiment and the primary elements of the disclosure described in Summary. In the embodiment, the engine 22 corresponds to the "engine", the fuel supply device 150 corresponds to the "fuel supply device", the motor 30 corresponds to the "motor", the high voltage battery 60 corresponds to the "power storage device", and the HVECU 70 and the engine ECU 24 corresponds to the "controller".

The aspect of the disclosure is described above to the embodiment. The disclosure is, however, not limited to the above embodiment but various modifications and variations may be made to the embodiment without departing from the scope of the disclosure.

INDUSTRIAL APPLICABILITY

The technique of the disclosure is applicable to the manufacturing industries of the hybrid electric vehicle and so on.

What is claimed is:

1. A hybrid electric vehicle, comprising: an engine including an in-cylinder injection valve; a fuel supply device configured to supply fuel to the in-cylinder injection valve; a motor configured to generate power using power from the engine and output power for running; a power storage device configured to exchange power with the motor; and a controller programmed to control the engine, the fuel supply device, and the motor, wherein when the vehicle is stopped and removal of deposits from the in-cylinder injection valve is not required, and forced charging of the power storage device with load operation of the engine is not being performed, the controller is programmed to control the fuel supply device so that a supply fuel pressure, which is the pressure of the fuel supplied to the in-cylinder injection valve, is at a first fuel pressure, when the vehicle is stopped and the removal of the deposits is required, and the forced charging of the power storage device is being performed, the controller is programmed to control the fuel supply device so that the supply fuel pressure is at a second fuel pressure higher than the first fuel pressure, and when the vehicle is stopped and the removal of the deposits is required, and the forced charging of the power storage device is not being performed, the controller is programmed to control the fuel supply device so that the supply fuel pressure is at a third fuel pressure higher than the first fuel pressure and lower than the second fuel pressure.

2. The hybrid electric vehicle according to claim 1, wherein the controller is programmed to operate the engine at idle when the engine is running and the forced charging of the power storage device is not being performed, and the second fuel pressure is set within a range where a minimum injection amount that is allowed to be injected from the in-cylinder injection valve is equal to or less than an idle injection amount required for idle operation of the engine.

* * * * *